United States Patent [19]

Prier

[11] Patent Number: 4,910,256

[45] Date of Patent: Mar. 20, 1990

[54] MIXTURES OF POLY(ALKYLENE CARBONATE) POLYOLS AND POLYMERS OF ETHYLENICALLY UNSATURATED ESTERS

[75] Inventor: Donald G. Prier, Baton Rouge, La.

[73] Assignee: The Dow Chemical Company, Midland, Mich.

[21] Appl. No.: 279,393

[22] Filed: Dec. 2, 1988

[51] Int. Cl.$^4$ .............................................. C08L 71/02
[52] U.S. Cl. ................................ 525/186; 252/182.11; 525/123; 525/185; 525/187; 525/461
[58] Field of Search ............... 525/187, 186, 185, 461; 528/370; 252/182.11

[56] References Cited

U.S. PATENT DOCUMENTS 3,833,404  9/1974  Sperling et al. ..................... 117/63
4,302,553  11/1981  Frisch et al. ....................... 525/28
4,713,399  12/1987  Webb et al. ....................... 521/110

Primary Examiner—Theodore E. Pertilla

[57] ABSTRACT

Modified mixtures of poly(alkylene carbonate) polyols and polymers of certain unsaturated esters are prepared by (A) forming a mixture of a polymer of an ethylenically unsaturated ester and a polyalkylene carbonate polyol and (B) subjecting such mixture to conditions sufficient to induce a transesterification reaction between the polymer of an acrylic ester and a polyalkylene carbonate polyol.

10 Claims, No Drawings

MIXTURES OF POLY(ALKYLENE CARBONATE) POLYOLS AND POLYMERS OF ETHYLENICALLY UNSATURATED ESTERS

BACKGROUND OF THE INVENTION

This invention relates to mixtures of polyalkylene carbonates and polymer(s) of ethylenically unsaturated esters.

Polyalkylene carbonate polyols (PACs) are well known and useful, for example, in the preparation of polyurethanes. Although these PACs have many excellent properties, it is often desirable to modify their properties for specific applications.

One particular problem associated with PAC polyols is that they exhibit some hydrolytic instability. Accordingly, polyurethanes made using PAC polyols are often unsuitable for applications involving extensive contact with water. It is desirable to provide a PAC polyol which is useful in preparing polyurethanes with improved hydrolytic stability.

SUMMARY OF THE INVENTION

In one aspect, this invention is a mixture comprising
(A) a polyalkylene carbonate polyol,
(B) a polymer of an ethylenically unsaturated ester, and
(C) an ester or carbonate of a polyalkylene carbonate polymer and a polymer of an acrylic ester.

In another aspect, this invention is a process comprising
(A) forming a mixture of a polymer of an ethylenically unsaturated ester and a polyalkylene carbonate polyol and
(B) subjecting such mixture to conditions sufficient to induce a transesterification reaction between the polymer of an acrylic ester and a polyalkylene carbonate polyol.

The mixture of this invention has a range of desirable properties which render it useful for many applications. Of particular interest are mixtures in which a somewhat hydrophobic polyacrylate is present. Such mixtures exhibit improved hydrolytic stability compared to the polyalkylene carbonate alone.

DETAILED DESCRIPTION OF THE INVENTION

The mixture of this invention comprises as a first component a polyalkylene carbonate polyol. The polyalkylene carbonate polyols (PACs) useful herein contain a plurality of carbonate linkages which are alkylene or polyoxyalkylene groups which are linked together with carbonate groups, and have at least 2 terminal hydroxyl groups per molecule. Such polyalkylene carbonate polyols are well-known and described, for example, in U.S. Pat. Nos. 4,713,399; 4,686,274; 4,634,743 and 4,528,364, incorporated herein by reference. The PAC is advantageously the reaction product of an alkylene oxide and carbon dioxide or of an alkylene oxide and a cyclic alkylene carbonate. The $CO_2$ content of the PAC is not particularly critical, and advantageously is about 2 to about 33, preferably about 10 to about 25, more preferably about 12 to about 20 percent of the weight of the PAC. The PAC contains at least two hydroxyl groups per molecule, and preferably contains about 2 to about 6, more preferably about 2 to about 4, most preferably about 2 to about 3 hydroxyl groups per molecule. The equivalent weight of the PAC is advantageously such that it is useful in the preparation of polyurethanes, and the PAC has a viscosity which is low enough to be easily processable in making polyurethanes. An equivalent weight of about 150 to about 3000, preferably about 250 to about 2000, more preferably about 250 to about 1000 has been found to be useful in this invention.

Alkylene oxides useful in this invention include oxiranes having up to 12, preferably up to 6, more preferably 2 or 3 carbon atoms. Similarly, the cyclic carbonates useful to form the PAC include those in which the alkylene group has from about 2 to abut 12, preferably about 2 to abut 6, more preferably about 2 to 3 carbon atoms. Such cyclic carbonates advantageously have a structure represented as:

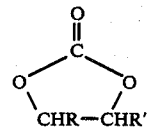

wherein R and R' are each independently hydrogen or lower alkyl. Preferably, R is hydrogen and R' is hydrogen or $C_1$–$C_4$ alkyl. Most preferably, R is hydrogen and R' is hydrogen or methyl. The preferred PACs are copolymers of carbon dioxide, ethylene carbonate or propylene carbonate with ethylene oxide or propylene oxide. Especially preferred PACs are copolymers of carbon dioxide or ethylene carbonate with ethylene oxide.

The second component of this mixture is a polymer of an ethylenically unsaturated ester (hereinafter called "addition polymer"). The addition polymer is advantageously of a molecular weight and composition such that it is a soluble or miscible in the PAC. It is preferred that the addition polymer be a liquid or low melting solid, with liquids being especially preferred.

Of particular interest are polymers and interpolymers of vinyl esters such as vinyl acetate and acrylic and methacrylic esters, preferably $C_1$–$C_8$, more preferably $C_1$–$C_4$ alkyl and hydroxyalkyl esters of acrylic or methacrylic acid. Exemplary ethylenically unsaturated esters, include methyl acrylate, methyl methacrylate, ethyl acrylate, ethyl methacrylate, hydroxyethylacrylate, hydroxyethyl methacrylate and the like. Mixtures of such esters are suitable. Homopolymers of these monomers are useful herein, but in order to increase equivalent weight or to modify physical or other properties, it is often desirable to employ an interpolymer of the unsaturated ester and a second, copolymerizable ethylenically unsaturated monomer other than an ester. Suitable such other monomers include aliphatic conjugated dienes such as butadiene and isoprene, monovinylidene aromatic monomers such as styrene, alpha-methyl styrene, ar-chloro styrene, ar-cyano styrene, and ar-bromo styrene, ethylenically unsaturated nitriles and amides such as acrylonitrile, methacrylonitrile, acrylamide, methacrylamine, N,N-dimethylacrylamide, N(dimethylaminomethyl)acrylamide and the like; vinyl ethers and vinyl ketones, vinyl and vinylidene halides as well as a wide variety of other ethylenically unsaturated materials which are copolymerizable with the aforementioned ethylenically unsaturated ester. Exemplary such monomers are described in U.S. Pat. Nos. 3,832,201 and 3,383,351, incorporated herein by reference.

When a mixture of monomers is used, it is preferred to use sufficient of the ethylenically unsaturated ester to provide an equivalent weight (based on ester groups) of about 100 to about 2000, preferably about 150 to about 1000, more preferably about 200 to about 500. Equivalent weights within these ranges provide mixtures of this invention with properties which are particularly useful for preparing polyurethanes.

The addition polymer is prepared in any convenient manner, as long as the resulting polymer is capable of forming a liquid mixture with the PAC. It is preferred, however, to polymerize the addition polymer in situ in the PAC.

The polymerization of ethylenically unsaturated monomers in a polyol is well known and described, for example, in U.S. Pat. No. 3,833,404; 3,041,292; 4,302,553 and 3,426,102, incorporated by reference. The general conditions described in those patents are useful herein. However, because of the ability of the PAC and the addition polymer to undergo transesterification, particular care as to temperature and components should be taken. The temperature of polymerization must be less than that at which significant transesterification reactions occur between the PAC and the ester-containing monomers of the addition polymer. Accordingly, it is preferred to use a free-radical initiator in polymerizing the ethylenically unsaturated monomers, and in particular one which has a half-life of less than 20 minutes at a temperature below 150°, preferably below 130° C. It is further desirable to conduct the polymerization in the substantial absence of a transesterification catalyst, as described below.

In conducting such an in situ polymerization, it is preferred to add the monomers to the PAC slowly under polymerization conditions in order to control the molecular weight of the polymer. Advantageously, the monomers are added to the PAC over a period of about 0.5 to about 10, preferably about 1 to about 4 hours. The polymerization temperature is advantageously about 50° to about 150°, preferably about 80° to about 130°, more preferably about 100° to about 125° C., although as is well known in the art, the optimum temperature in any case may depend somewhat on the particular monomers employed. After addition of monomers is completed, the reaction mixture is advantageously maintained at the reaction temperature for about 0.5 to about 10, preferably about 1 to about 5 hours to finish off the reaction. It is usually important to agitate the mixture during the feeding and polymerization of the monomers to ensure the production of an addition polymer which is soluble in the PAC.

A free radical initiator is advantageously and preferably used in the polymerization reaction. Suitable such initiators include organic peroxides, organic peresters, the so-called "azo" catalysts. These are advantageously used in an amount within the range from about 0.05 to about 10, preferably from about 0.2 to about 5, more preferably about 0.25 to about 3 and most preferably about 0.25 to about 1 part by weight per 100 parts of monomer.

Optionally, a chain transfer agent or other materials known to be useful in preparing additions polymers may be used herein. Of particular interest are chain transfer agents such as alkyl mercaptans and inorganic iodine releasing compounds, as described in U.S. Pat. Nos. 4,581,418, 4,574,137, and 3,953,393.

The mixture resulting from the in situ polymerization reaction is advantageously a viscous liquid which may contain a small amount of discrete, suspended particles. It is preferred, however, that only a minor proportion of the addition polymer is in the form of discrete particles. More preferably, less than about 20, most preferably less than about 5 weight percent of the addition polymer is in the form of discrete particles. Such mixture also advantageously has an equivalent weight from about 200 to about 5000, preferably about 200 to about 2000, more preferably about 200 to about 1000.

The third component of the mixture of this invention is an ester or carbonate of a polyalkylene carbonate polymer and a polymer of an ethylenically unsaturated ester. This component is conveniently prepared in situ by subjecting the aforedescribed mixture of PAC and addition polymer to conditions under which an "ester exchange" reaction occurs. The terms "ester exchange", "transesterify", "transesterification" and like terms are used herein to designate a reaction involving an ester and a carbonate in which an ester or carbonate group undergoes cleavage at an —O—C(O) bond to form a oxy-terminated radical which replaces and is replaced with another oxy-terminated radical at an ether or carbonate groups in another molecule. These terms are therefore used herein in a sense slightly broader than their usual meaning.

The ester exchange reaction is advantageously conducted by heating the addition polymer and the PAC to an elevated temperature, but below that at which thermal degradation of the polymers occurs. This temperature is suitably at least about 130, more preferably about 150–250, most preferably about 160°–225° C. Heating at this temperature for about 30 minutes to about 4 hours is generally sufficient to effect the ester exchange reaction.

If desired, an ester exchange catalyst can be used to speed the rate of the reaction. Among such catalysts are sodium hydroxide, potassium carbonate and potassium hydroxide.

After the ester exchange reaction is completed, the resulting product is ready for use immediately after cooling.

The mixture of this invention is useful for, among other things, the preparation of polyurethane polymers. Because the mixture of this invention contains an average of at least two hydroxyl groups per molecule, it can be used in the same manner of conventional polyols of like equivalent weight and functionality. Accordingly, the mixture of this invention can be used to make polyurethane dynamic elastomers, static elastomers, rigid and flexible foams, as well as other types of polyurethanes. It can be blended with other active hydrogen-containing materials as described, for example, in U.S. Pat. No. 4,394,491 to form an active hydrogen-containing composition which is suitable for preparing polyurethane having poarticular physical properties, In preparing polyurethanes, the mixture of this invention is reacted with a polyisocyanate. Either aliphatic or aromatic polyisocyanates can be used in this invention to make a polyurethane. Suitable aliphatic polyisocyanates include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate, 1,5-diisocyanato-3,3,5-trimethylcyclohexane, 2,4- and/or 2,6-hexahydrotoluene diisocyanate, perhydro-2,4'- and/or -4,4'-diphenylmethanediisocyanate (H$_{12}$MDI), isophorone diisocyanate, and the like.

Suitable aromatic polyisocyanates include, for example, 2,4- and/or 2,6-toluene diisocyanate (TDI), 2,4'-diphenylmethanediisocyanate, 1,3- and 1,4-phenylene diisocyanate, 4,4'-diphenylmethane diisocyanate (including mixtures thereof with minor quantities of the 2,4'-isomer), 1,5-naphthylene diisocyanate, triphenylmethane-4,4',4"-triisocyanate, polyphenylpolymethylene polyisocyanates, and the like.

In addition, derivatives and prepolymers of the foregoing polyisocyanates such as those containing urethane, carbodiimide, allophanate, isocyanurate, acylated urea, biuret, ester and similar groups are useful herein.

In addition to the polyisocyanate and mixture of this invention, catalysts, mold release agents, crosslinkers, chain extenders, antioxidants, blowing agents, fillers, colorants, cell openers and other auxiliaries useful in the preparation of polyurethanes are useful herein. Among these, of particular significance are catalysts, especially tertiary amine and organometallic compounds; blowing agents, especially water and low boiling halocarbons; chain extenders such as aromatic diamines, alkylene glycols and glycol ethers; and crosslinkers such as diethanolamine and methylene bis(o-chloroaniline).

The preparation of flexible polyurethane foam is described, for example, in U.S. Pat. No. 3,141,865. The preparation of rigid polyurethane foam is described, for example, in U.S. Pat. No. 4,066,580. The preparation of polyurethane dynamic elastomers is described, for example, in U.S. Pat. No. 3,917,702. The preparation of polyurethane static elastomers is described, for example, in U.S. Pat. Nos. 4,218,543 and 4,269,945. All of these patents are incorporated herein by reference.

The resulting polyurethanes are useful for cushioning, insulation, automobile fascia, fan belts, and like applications.

The mixture of this invention provides the polyurethane with physical properties which are not provided with the use of the PAC alone. In particular, the mixture of this invention provides improved hydrolytic stability compared to the unmodified PAC.

The following examples are given to illustrate the invention and should not be interpreted as limiting it in any way. Unless stated otherwise, all parts and percentages are given by weight.

EXAMPLE 1

Into a suitable container is placed 887.61 g of a 357 equivalent weight, 21.5% $CO_2$, difunctional poly(ethylene carbonate) and 0.5 ml of t-butyl perbenzoate. This mixture is heated to 125° C. under nitrogen with stirring. At this temperature, a mixture of 0.05 g t-butyl perbenzoate and 98.6 g 2-hydroxyethylacrylate is added dropwise over a period of 2.5 hours. This resulting mixture is then heated at 125° C. for an additional hour, at which time another 0.5 ml of t-butyl perbenzoate is added. The mixture is then heated for four more hours at the stated temperature.

The resulting mixture of PAC and poly(2-hydroxyethylacrylate) is transesterified by raising the temperature of the mixture to 175° C. for one hour. The resulting product is a viscous liquid containing a small amount of suspended solids. Its equivalent weight is 296, which agrees with theoretical calculations. A gel permeation chromatographic analysis shows no residual 2-hydroxyethylacrylate in the mixture.

The mixture made in this example is used to form a polyurethane elastomer. A 180 part sample of the mixture is mixed with 21.6 parts of 1,4-butanediol and heated at 70° C. for 15 minutes at a pressure of 1 torr. To this mixture is added 164.8 parts of a 168 equivalent weight liquified diphenylmethanediisocyanate, followed by stirring at ambient temperature for about 2 minutes at a pressure of 1 torr. This mixture is then poured into a ⅛ inch sheet mold and cured at 265° C. overnight.

The resulting elastomer is cut into tensile bars and some of these are placed into a jar of distilled water at 70° C. After 4 days, some of the tensile bars are removed from the water and dried at 70° C. overnight. After 10 days, the remaining tensile bars are removed from the water and similarly dried.

The tensile bars are evaluated for tensile strength at 100% elongation. Since PAC polyols are known to be hydrolytically unstable, it is expected that the tensile strength will be reduced upon water soaking. Thus, the tensile strength of the soaked samples is reported as a percentage of that of the unsoaked samples. The elastomer of this invention retained 100 percent of its tensile strength after 4 days water soak and 78% of its tensile after 10 days water soak.

For comparison, when a similar PAC transesterified with 1,6-hexanediol is used to prepare polyurethane elastomers, the elastomer retains only 81% of its tensile strength after 4 days water soak, and only 72% after 10 days. An elastomer prepared from an MEG-adipate polyester retains only 90% of its tensile strength after 4 days water soak and 72 percent after 10 days.

EXAMPLE 2

Into a suitable vessel are added 804.2 parts of a 480 equivalent weight, 20% $CO_2$, difunctional poly(ethylene carbonate) and 0.4 parts of t-butyl perbenzoate. This mixture is heated to 125° C. with stirring under a nitrogen pad. To this mixture is added a blend of 71.5 parts butyl acrylate, 17.8 parts 2-hydroxyethylacrylate and 0.04 parts t-butyl perbenzoate. This blend is added dropwise to the reaction vessel at 125° C. over a period of 2 hours, with vigorous stirring. The resulting mixture is then heated at 125° C. for an additional 4 hours.

Transesterification is conducted by then heating the mixture to 175° C. for one hour. The resulting product is a clear liquid without suspended solids. Its equivalent weight is 493, which is not significantly different from the theoretical equivalent weight of 488.

What is claimed is:

1. A mixture comprising
   (A) a polyalkylene carbonate polyol,
   (B) a polymer of an ethylenically unsaturated ester and
   (C) an ester or carbonate of a polyalkylene carbonate polymer and a polymer of an acrylic ester.

2. The mixture of claim 2 wherein component (B) is a polymer of an acrylic or methacrylic ester.

3. The mixture of claim 2 wherein component (A) is a polyalkylene carbonate polyol having an equivalent weight from about 250 to about 2000, a functionality of about 2 to about 4, and a $CO_2$ content of about 10 to about 25 percent by weight.

4. The mixture of claim 3 wherein component (C) is a product of an ester exchange reaction between components (A) and (B).

5. The mixture of claim 4 wherein component (B) is prepared by the in situ polymerization of an acrylic or methacrylic ester in component (A).

6. The mixture of claim 5 wherein component (A) is a poly(ethylene carbonate), a poly(propylene carbonate) or mixture thereof.

7. The mixture of claim 5 wherein component (A) is a polymer of ethylene oxide and carbon dioxide.

8. The mixture of claim 6 wherein component (B) is a polymer of a $C_2$-$C_6$ alkyl or $C_2$-$C_6$ hydroxyalkyl ester of acrylic or methacrylic acid.

9. The mixture of claim 7 wherein component (B) is a polymer or interpolymer of hydroxyethylacrylate.

10. The mixture of claim 8, wherein the mixture has an equivalent weight from about 200 to about 2000.

* * * * *